(12) United States Patent
Liu

(10) Patent No.: US 11,061,274 B2
(45) Date of Patent: Jul. 13, 2021

(54) BACKLIGHT MODULE AND DISPLAY DEVICE

(71) Applicant: WUHAN CHINA STAR OPTOELECTRONICS TECHNOLOGY CO., LTD, Hubei (CN)

(72) Inventor: Fancheng Liu, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/631,178

(22) PCT Filed: Oct. 30, 2019

(86) PCT No.: PCT/CN2019/114236
§ 371 (c)(1),
(2) Date: Jan. 15, 2020

(87) PCT Pub. No.: WO2021/017229
PCT Pub. Date: Feb. 4, 2021

(65) Prior Publication Data
US 2021/0033924 A1    Feb. 4, 2021

(30) Foreign Application Priority Data

Jul. 29, 2019 (CN) .......................... 201910690639.X

(51) Int. Cl.
*G02F 1/13357* (2006.01)
*G02F 1/1335* (2006.01)

(52) U.S. Cl.
CPC .. *G02F 1/133603* (2013.01); *G02F 1/133606* (2013.01); *G02F 1/133614* (2021.01)

(58) Field of Classification Search
None
See application file for complete search history.

(56) References Cited

U.S. PATENT DOCUMENTS 8,876,316 B2 * 11/2014 Lu .......................... G09F 13/04
362/97.1
2014/0111970 A1    4/2014 Lu et al.
(Continued)

FOREIGN PATENT DOCUMENTS

CN      102147074 A    8/2011
CN      102537761 A    7/2012
(Continued)

*Primary Examiner* — Britt D Hanley
(74) *Attorney, Agent, or Firm* — Mark M. Friedman

(57) ABSTRACT

The present invention provides a backlight module. The backlight module includes a light source, an optical film, a diffusion plate, a back plate, and LED strips disposed on the back plate. The back plate forms a receiving cavity and includes at least two coupled LED strips. The light source, the diffusion plate, and the optical film are arranged in the receiving cavity. Wherein, LED lamps which are at an end of the LED strips and adjacent to a coupling position have an illuminating inner diameter on the diffusion plate, and the illuminating inner diameter is greater than an edge length to the coupling position, which improves technical problems of poor backlight mixing in backlight modules.

16 Claims, 7 Drawing Sheets

(56) References Cited

U.S. PATENT DOCUMENTS

2019/0043940 A1\* 2/2019 Lee .................. G09G 5/00
2020/0176430 A1   6/2020 Wu et al.

FOREIGN PATENT DOCUMENTS

| CN | 103775905 | A |   | 5/2014 |
|----|-----------|---|---|--------|
| CN | 107966825 | A |   | 4/2018 |
| CN | 109326226 | A |   | 2/2019 |
| CN | 109387981 | A | * | 2/2019 |
| CN | 109387981 | A |   | 2/2019 |
| CN | 208606014 | U |   | 3/2019 |
| CN | 109613758 | A |   | 4/2019 |
| CN | 109656058 | A |   | 4/2019 |
| CN | 109782487 | A |   | 5/2019 |
| CN | 110061116 | A |   | 7/2019 |
| KR | 20190060519 | A |   | 6/2019 |

\* cited by examiner

BACKLIGHT MODULE AND DISPLAY DEVICE

FIELD OF INVENTION

The present application relates to the field of display technologies, and in particular, to a backlight module.

BACKGROUND OF INVENTION

At present, for large and medium-sized mini LEDs, only multiple coupling methods can be used to achieve larger sizes. However, because a coupling distance becomes smaller, light mixing is uneven and dark lines appear.

Therefore, current backlight modules have a technical problem of poor light mixing effect which needs to be improved.

SUMMARY OF THE INVENTION

The present invention provides a backlight module, which is used to solve the technical problem that the current backlight module has poor mixing effect.

In order to solve the above problems, the technical solution provided by the present application is as follows:

An embodiment of the present invention provides a backlight module comprising:

a back plate forming a receiving cavity;

a light source arranged in the receiving cavity and disposed on a bottom surface of the back plate, wherein the light source comprises at least two LED strips coupled to the back plate, the LED strips comprise a plurality of first LED lamps and a plurality of second LED lamps, and the first LED lamps are disposed in a coupling area;

a diffusion plate arranged in the receiving cavity and disposed in a light emitting direction of the LED strip, wherein a distance between the diffusion plate and the LED lamps on the LED strip is less than a default value;

an optical film arranged in the receiving cavity and disposed in a light emitting direction of the diffusion plate;

wherein the LED lamp which is at an end of the LED strip and adjacent to a coupling position has an illuminating inner diameter on the diffusion plate, and the illuminating inner diameter is greater than an edge length to the coupling position.

In the backlight module provided by the present invention, in the coupling area, an illumination angle of the LED lamp is a first angle, and the first angle is greater than a threshold value.

In the backlight module provided by the present invention, an illumination angle of the first LED lamp is the first angle, an illumination angle of the second LED lamp is a second angle, and the first angle is greater than the second angle.

In the backlight module provided by the present invention, illumination angles of the first LED lamp and the second LED lamp are both the first angle.

In the backlight module provided by the present invention, a distance between two adjacent first LED lamps is less than a distance between two adjacent second LED lamps.

In the backlight module provided by the present invention, in the coupling area, the distances between the first LED lamps are different, and the distance between the first LED lamps close to a coupling slit is short.

In the backlight module provided by the present invention, in the coupling area, the distances between the first LED lamps are the same.

In the backlight module provided by the present invention, in the coupling area, the distances between the first LED lamps are gradually reduced in a direction toward the coupling slit.

In the backlight module provided by the present invention, the first LED lamps are white LED lamps and the second LED lamps are white LED lamps.

In the backlight module provided by the present invention, the first LED lamp is a blue LED lamp, a conversion film is provided in a light emitting direction of the first LED lamp, and the conversion film converts blue light into white light.

In the backlight module provided by the present invention, the conversion film is disposed on a side of the diffusion plate close to the LED strip.

An embodiment of the present invention provides a backlight module comprising:

a back plate, forming a receiving cavity;

a light source arranged in the receiving cavity and disposed on a bottom surface of the back plate, wherein the light source comprises at least two LED strips coupled to the back plate, the LED strips comprise a plurality of first LED lamps and a plurality of second LED lamps, the first LED lamps are disposed in a coupling area, the first LED lamps are white LED lamps, and the second LED lamps are white LED lamps;

a diffusion plate arranged in the receiving cavity and disposed in a light emitting direction of the LED strip, wherein a distance between the diffusion plate and the LED lamps on the LED strip is less than a default value;

an optical film arranged in the receiving cavity and disposed in a light emitting direction of the diffusion plate;

wherein the LED lamp which is at an end of the LED strip and adjacent to a coupling position has an illuminating inner diameter on the diffusion plate, and the illuminating inner diameter is greater than an edge length to the coupling position.

In the backlight module provided by the present invention, in the coupling area, an illumination angle of the LED lamp is a first angle, and the first angle is greater than a threshold value.

In the backlight module provided by the present invention, an illumination angle of the first LED lamp is the first angle, an illumination angle of the second LED lamp is a second angle, and the first angle is greater than the second angle.

In the backlight module provided by the present invention, illumination angles of the first LED lamp and the second LED lamp are both the first angle.

In the backlight module provided by the present invention, a distance between two adjacent first LED lamps is less than a distance between two adjacent second LED lamps.

In the backlight module provided by the present invention, in the coupling area, the distances between the first LED lamps are different, and the distance between the first LED lamps close to a coupling slit is short.

In the backlight module provided by the present invention, in the coupling area, the distances between the first LED lamps are the same.

In the backlight module provided by the present invention, in the coupling area, the distances between the first LED lamps are gradually reduced in a direction toward the coupling slit.

In the backlight module provided by the present invention, the first LED lamps are white LED lamps and the second LED lamps are white LED lamps.

In the backlight module provided by the present invention, the first LED lamp is a blue LED lamp, a conversion film is provided in a light emitting direction of the first LED lamp, and the conversion film converts blue light into white light.

In the backlight module provided by the present invention, the conversion film is disposed on a side of the diffusion plate close to the LED strip.

The beneficial effects of the present invention are as follows: The present invention provides a backlight module. The backlight module includes a light source, an optical film, a diffusion plate, a back plate, and LED strips disposed on the back plate. The back plate forms a receiving cavity. The light source is arranged in the receiving cavity and disposed on a bottom surface of the back plate. The light source includes at least two coupled LED strips. The diffusion plate is arranged in the receiving cavity and disposed in a light emitting direction of the LED strips. A distance between the diffusion plate and LED lamps on the LED strips is less than a default value. The optical film is arranged in the receiving cavity and disposed in a light emitting direction of the diffusion plate. Wherein, the LED lamps which are at an end of the LED strips and adjacent to a coupling position have an illuminating inner diameter on the diffusion plate, and the illuminating inner diameter is greater than an edge length to the coupling position. When a light mixing distance is less than the default value, the LED lamps which are at an end of the LED strips and adjacent to a coupling position have an illuminating inner diameter on the diffusion plate, and thus improves technical problems of poor light mixing in backlight modules.

DESCRIPTION OF DRAWINGS

In order to more clearly illustrate the embodiments or the technical solutions in the prior art, a brief introduction of the drawings used in the embodiments or the prior art description will be briefly described below. Obviously, the drawings in the following description are only some of the embodiments of the invention, and those skilled in the art can obtain other drawings according to the drawings without any creative work.

DETAILED DESCRIPTION OF PREFERRED EMBODIMENTS

The following description of the various embodiments is provided with reference to the accompanying drawings.

Directional terms, such as upper, lower, front, back, left, right, inner, outer, and lateral side, mentioned in the present invention are only for reference. Therefore, the directional terms are used for describing and understanding rather than limiting the present invention. In the figures, units having similar structures are used for the same reference numbers.

The present invention can solve the problem in the prior art that current backlight modules have poor light mixing effect.

Figure 1:
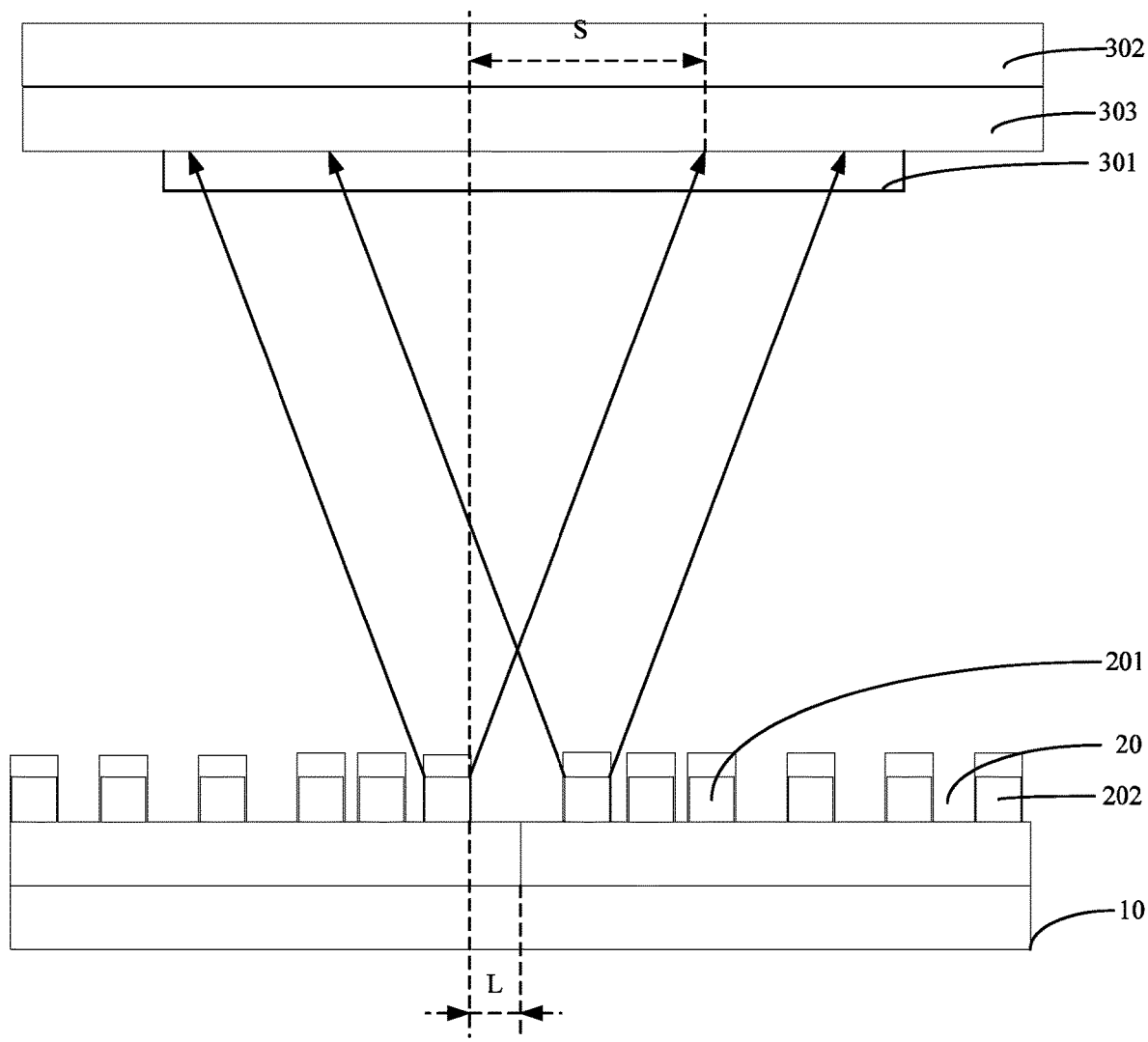
FIG. 1 is a first cross-sectional view of a backlight module according to an embodiment of the present invention.

For better explanation, some noun explanations are defined. As shown in FIG. 1, a coupling area is an area of one or more LED lamps on one side of a coupling slit. A distance is a width of a LED lamp plus a gap distance from an adjacent LED lamp. A blue LED lamp is an LED lamp that emits blue light, and a white LED lamp is an LED lamp that emits white light. S is an inner diameter length projected onto a diffusion film by the first LED lamp close to the coupling slit. A distance between the first LED lamp close to the coupling slit and the coupling slit is L. A first angle and a second angle are both defined as half of a light emitting angle of the LED lamp. A threshold value is an angle value when a light mixing distance becomes small and S is equal to L.

As shown in FIG. 1, a backlight module provided by the present invention comprises a light source, an optical film 302, a diffusion plate 303, a back plate 10, and LED strips on the back plate 10. The back plate 10 forms a receiving cavity. The light source is arranged in the receiving cavity and is disposed on a bottom surface of the back plate 10. The light source comprises at least two coupled LED strips 20. The LED strips 20 comprise a plurality of first LED lamps 201 and a plurality of second LED lamps 202, and the first LED lamps 201 are disposed in a coupling area. The diffusion plate 303 is arranged in the receiving cavity and disposed in a light emitting direction of the LED strips 20. Wherein, the LED lamps which are at an end of the LED strips and adjacent to a coupling position has an illuminating inner diameter on the diffusion plate 303, and the illuminating inner diameter is greater than an edge length to the coupling position.

In the present embodiment, the backlight module includes a light source, an optical film, a diffusion plate, a back plate, and LED strips disposed on the back plate. The back plate forms a receiving cavity. The light source is arranged in the receiving cavity and disposed on a bottom surface of the back plate. The light source includes at least two coupled LED strips. The diffusion plate is arranged in the receiving cavity and disposed in a light emitting direction of the LED strips. A distance between the diffusion plate and the LED lamps on the LED strips is less than a default value. The optical film is arranged in the receiving cavity and disposed in a light emitting direction of the diffusion plate. Wherein, the LED lamps which are at an end of the LED strips and adjacent to a coupling position has an illuminating inner diameter on the diffusion plate, and the illuminating inner diameter is greater than an edge length to the coupling position. When a light mixing distance is less than the default value, the LED lamps which are at an end of the LED strips and adjacent to a coupling position has an illuminating inner diameter on the diffusion plate, and thus improves the light mixing effect and improves the technical problem of poor light mixing effect of the backlight module.

Figure 2:
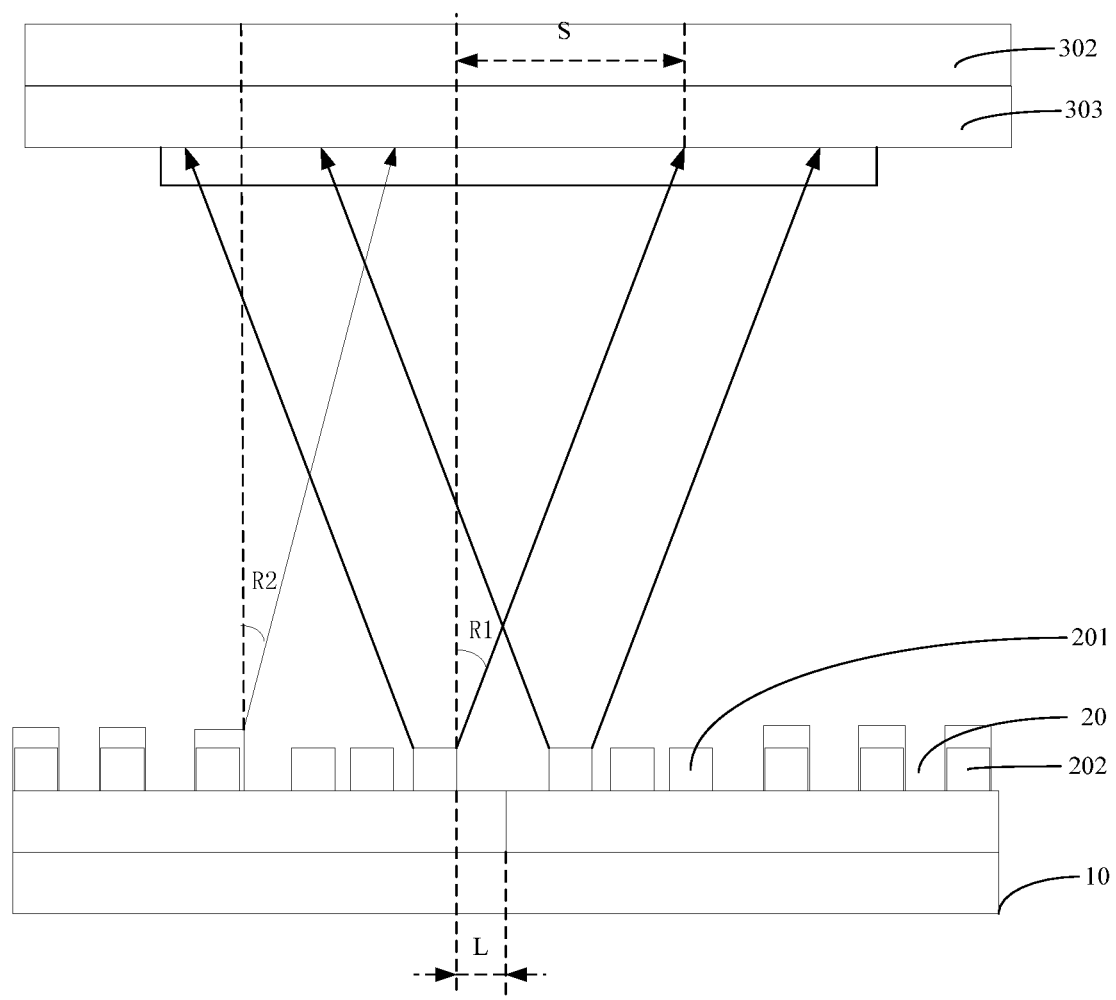
FIG. 2 is a second cross-sectional view of the backlight module according to the embodiment of the present invention.

In an embodiment, as shown in FIG. 2, in the coupling area, an illumination angle of the LED lamps is a first angle, and the first angle is greater than a threshold value. At a light mixing distance, the threshold value is an angle required when S is equal to L, and an illumination angle of a blue light is an illumination angle of a blue LED lamp without manual processing.

In an embodiment, as shown in FIG. 2, in the coupling area, an illumination angle of the first LED lamp 201 is the first angle R1, an illumination angle of a second LED lamp 202 is a second angle R2, and the first angle R1 is greater than the second angle R2. The illumination angle of the first LED lamp 201 in the coupling area is large. When the light mixing distance is a fixed value, the illumination angle of the LED lamp close to the coupling slit is larger, and the light mixing effect is better.

Figure 3:
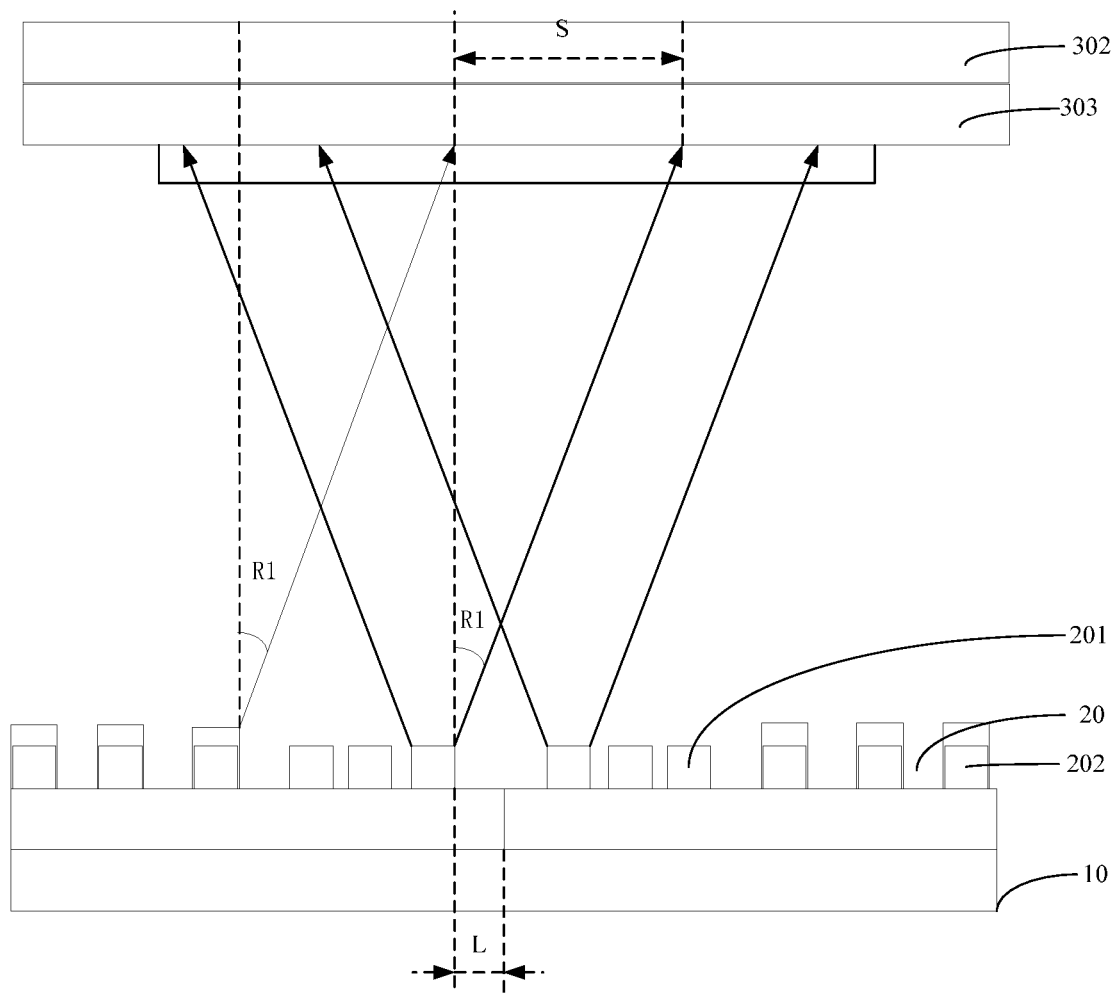
FIG. 3 is a third cross-sectional view of the backlight module according to the embodiment of the present invention.

In an embodiment, as shown in FIG. 3, illumination angles of the first LED lamp 201 and the second LED lamp 202 are both the first angle R1. In the embodiment, the illumination angle is made larger than the natural illumination angle of the white LED lamp. All of the first LED lamps 201 and the second LED lamps 202 are made into blue LED lamps, and can also achieve a larger illumination angle.

Figure 4:
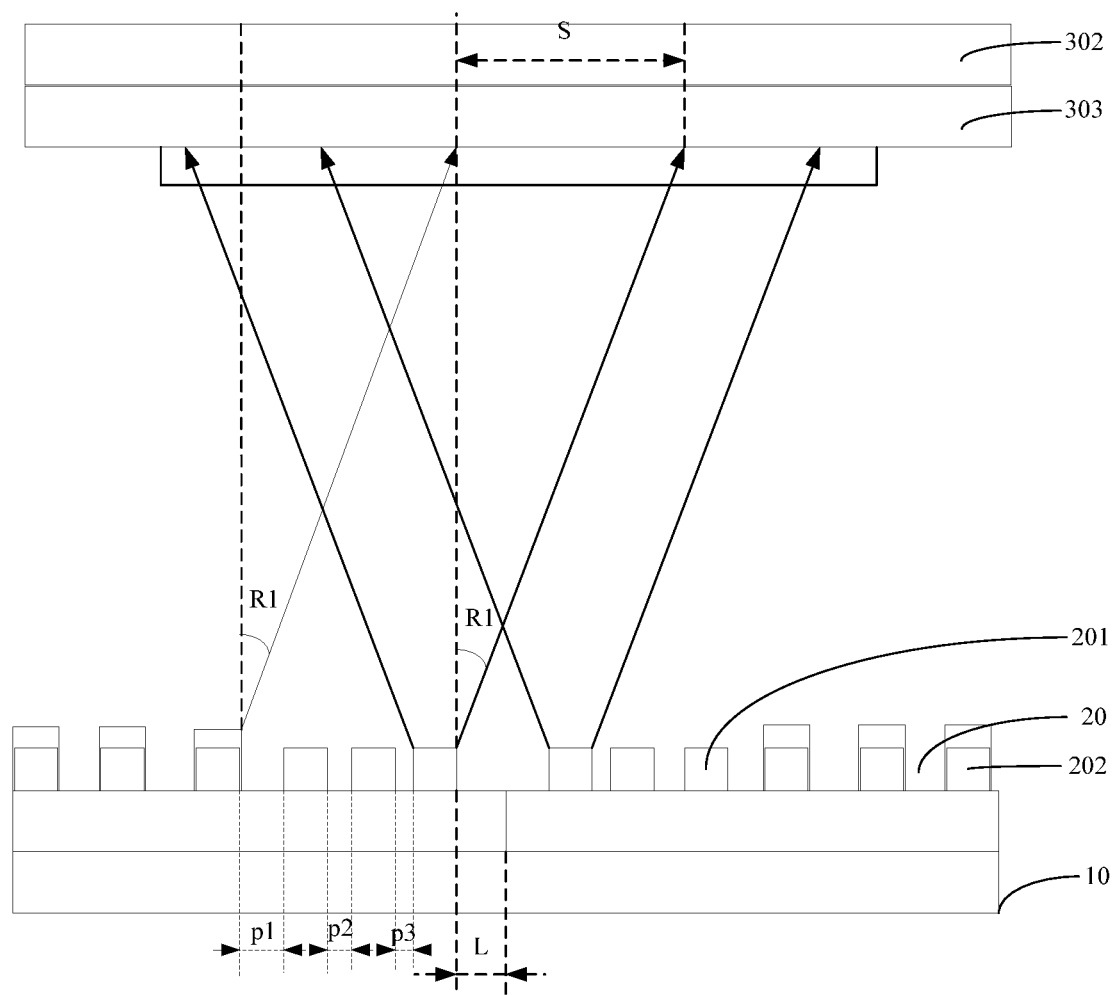
FIG. 4 is a fourth cross-sectional view of the backlight module according to the embodiment of the present invention.

In an embodiment, as shown in FIG. 4, a distance between two adjacent first LED lamps 201 is less than a distance between two adjacent second LED lamps 202. It can only change the distances of the first LED lamps 201 close to the coupling position. The small distance can make the number of LED lights set per unit area greater, obtaining more light intensity while improving the light mixing effect.

In an embodiment, as shown in FIG. 4, in the coupling area, the distances between the first LED lamps 201 are gradually reduced in a direction toward the coupling slit. This arrangement allows for a denser setting of the LED lamps close to the coupling slits. Under a same voltage, the LED light setting density is higher and the light mixing effect is better when the illumination angle is constant.

In an embodiment, in the coupling area, the distances between the first LED lamps are different, and the distance between the first LED lamps close to a coupling slit is short.

In an embodiment, in the coupling area, the distances between the first LED lamps 201 are the same, and the first LED lamps 201 have uniform density in the coupling area. The distance between two adjacent first LED lamps 201 is the same, the process is easier to implement, and the cost is saved.

In an embodiment, the first LED lamps 201 are white LED lamps, and the second LED lamps 202 are white LED lamps. The first LED lamps 201 and the second LED lamps 202 are both set as white LED lamps to make the process simpler and more common. The embodiment can also achieve better light mixing effect by improving the distance or the illuminating angle of the first LED lamps 201.

Figure 5:
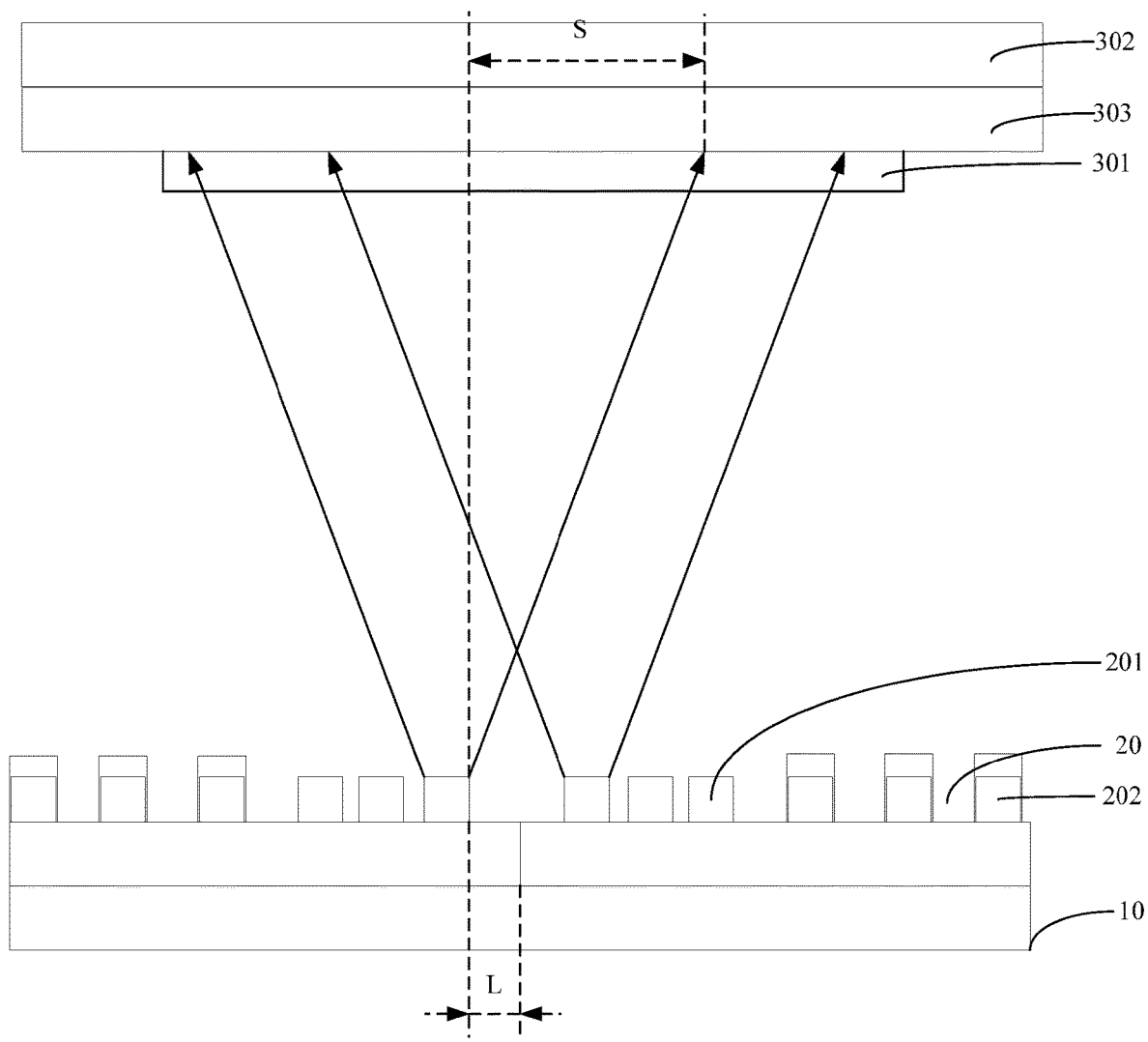
FIG. 5 is a fifth cross-sectional view of the backlight module according to the embodiment of the present invention.

In an embodiment, as shown in FIG. 5, the first LED lamps 201 are blue LED lamps, a conversion film 301 is provided in a light emitting direction of the first LED lamps 201, and the conversion film 301 converts blue light into white light. The conversion film 301 can be coated in a non-light board area. The blue light emitted by the blue LED lamps turns white light through luminescent particles.

In an embodiment, as shown in FIG. 5, the conversion film 301 is disposed on a side of the diffusion plate 303 close to the LED strips 20. The blue light emitted by the blue LED lamps passes through the luminescent particles disposed on one side of the diffusion plate to become white light, and does not affect the normal illumination of the display panel.

In an embodiment, as shown in FIG. 5, the whole conversion film 301 is disposed on one side of the diffusion plate. Because the normal coupling scheme is that the conversion film 301 is disposed on the blue LED lamps to form white LED lamps, and then through the coupling, the conversion film 301 at the coupling portion may have a problem that a fluorescent film is broken, affecting the continuity of the light and also causing dark lines. By disposing the conversion film 301 on an upper side of the diffusion plate, the film formed by the conversion film 301 can be a continuous film on the entire surface, which alleviates the problem of the fracture of the fluorescent film at the coupling.

Figure 6:
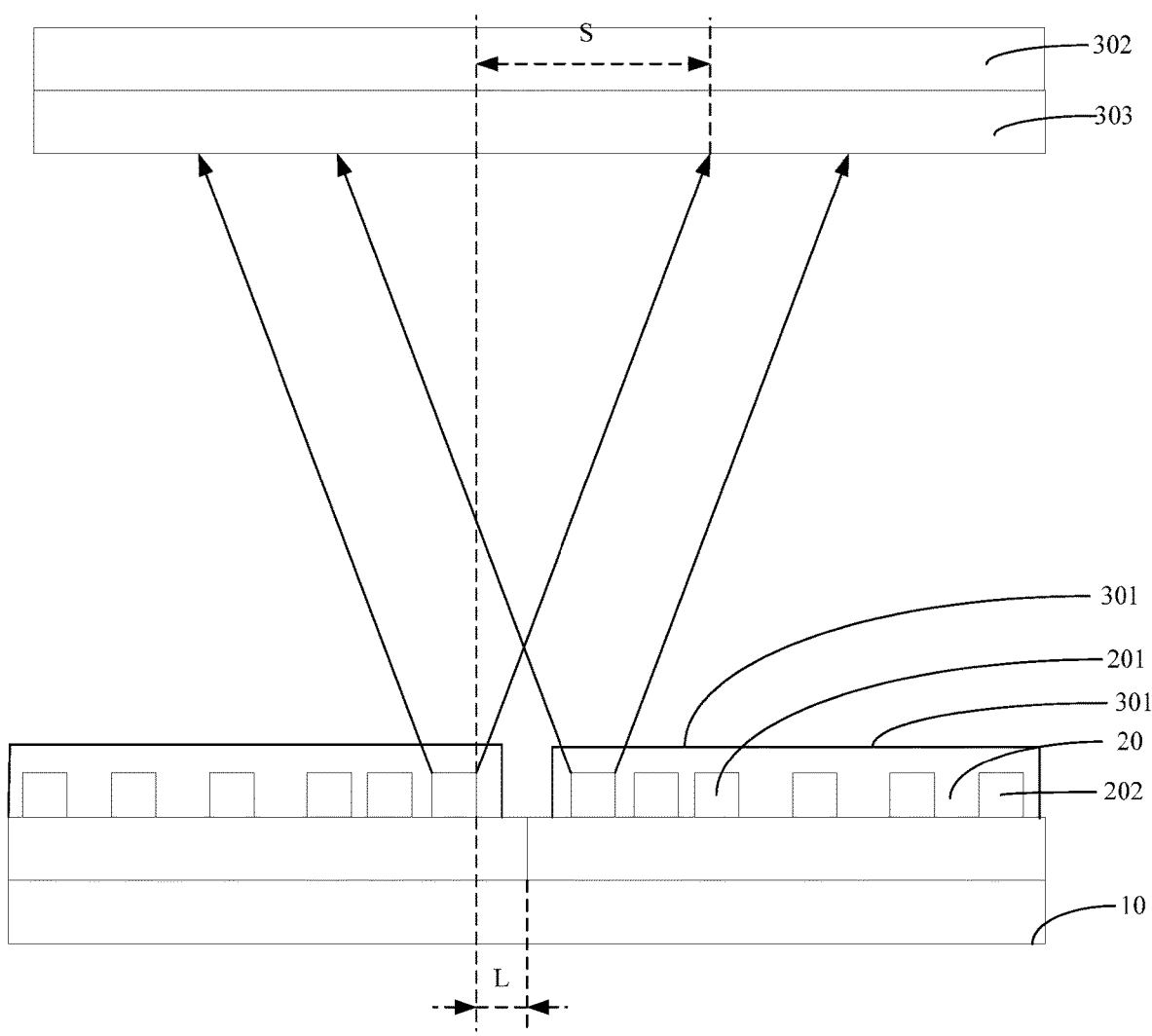
FIG. 6 is a sixth cross-sectional view of the backlight module according to the embodiment of the present invention.

In an embodiment, as shown in FIG. 6, the first LED lamps 201 and the second LED lamps 202 are white LED lamps, and the conversion film 301 is coated on the blue LED lamps to form a whole layer of white LED lamps.

Figure 7:
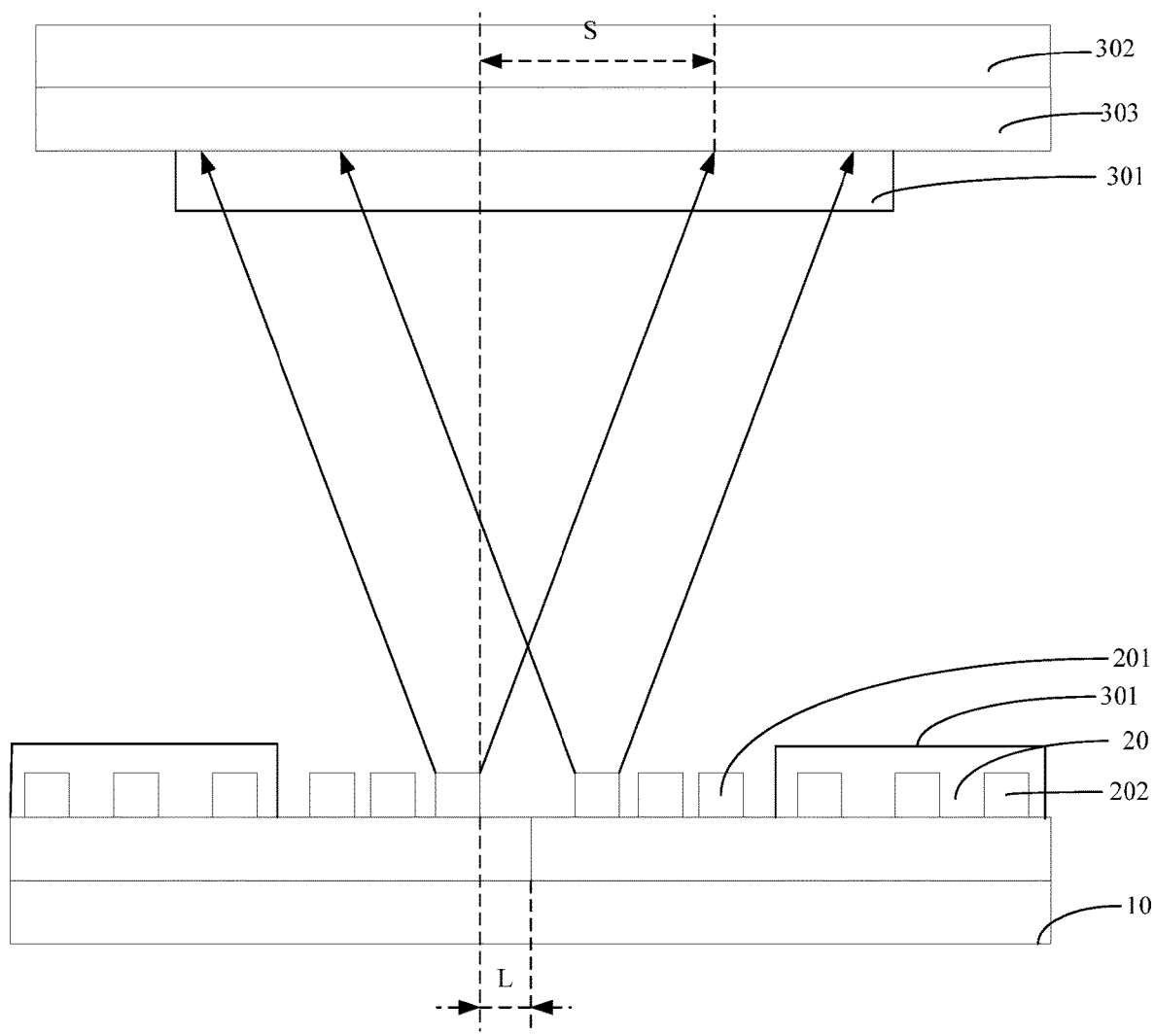
FIG. 7 is a seventh cross-sectional view of the backlight module according to the embodiment of the present invention.

In an embodiment, as shown in FIG. 7, the second LED lamps 202 are white LED lamps, and the conversion film 301 is coated on the second LED lamps 202 to form a whole layer of white LED lamps.

The present invention further provides a liquid crystal display panel comprising a backlight module and a display screen. The backlight module comprises a light source, an optical film 302, a diffusion plate 303, a back plate 10, and LED strips on the back plate 10. The back plate 10 forms a receiving cavity. The light source is arranged in the receiving cavity and is disposed on a bottom surface of the back plate 10. The light source comprises at least two coupled LED strips 20. The LED strips 20 comprise a plurality of first LED lamps 201 and a plurality of second LED lamps 202, and the first LED lamps 201 are disposed in a coupling area. The diffusion plate 303 is arranged in the receiving cavity and disposed in a light emitting direction of the LED strips 20. A distance between the diffusion plate and the LED lamps on the LED strips 20 is less than a default value. The optical film 302 is arranged in the receiving cavity and disposed in a light emitting direction of the diffusion plate 303. Wherein, the LED lamp which is at an end of the LED strips and adjacent to a coupling position has an illuminating inner diameter on the diffusion plate 303, and the illuminating inner diameter is greater than an edge length to the coupling position.

In the embodiment, the liquid crystal display panel comprises the backlight module and the display screen. The backlight module comprises the light source, the optical film 302, the diffusion plate 303, the back plate 10, and the LED strips on the back plate 10. The back plate 10 forms the receiving cavity. The light source is arranged in the receiving cavity and is disposed on the bottom surface of the back plate 10. The light source comprises the at least two coupled LED strips 20. The LED strips 20 comprise the plurality of first LED lamps 201 and the plurality of second LED lamps 202, and the first LED lamps 201 are disposed in the coupling area. The diffusion plate 303 is arranged in the receiving cavity and disposed in the light emitting direction of the LED strips 20. The distance between the diffusion plate and the LED lamps on the LED strips 20 is less than the default value. The optical film 302 is arranged in the receiving cavity and disposed in the light emitting direction of the diffusion plate 303. Wherein, the LED lamps which are at the end of the LED strips and adjacent to the coupling position have the illuminating inner diameter on the diffusion plate 303, and the illuminating inner diameter is greater than the edge length to the coupling position. When the light mixing distance is less than the default value, the first LED lamps 201 close to the coupling slit have the illuminating inner diameter on the diffusion plate 303, and the illuminating inner diameter is greater than the edge length to the coupling position, which improves the light mixing effect and improves the technical problem of poor light mixing effect of the backlight module.

In an embodiment, in the liquid crystal display panel, as shown in FIG. 2, in the coupling area, an illumination angle of the LED lamp is a first angle, and the first angle is greater than a threshold value. An illumination angle of blue light is usually greater than an illumination angle of white light, and the illumination angle of the blue light is an illumination angle of a blue LED lamp without manual processing.

In an embodiment, in the liquid crystal display panel, as shown in FIG. 2, an illumination angle of the first LED lamp 201 is a first angle R1, an illumination angle of the second LED lamp 202 is a second angle R2, and the first angle R1 is greater than the second angle R2. The illumination angle of the first LED lamp 201 in the coupling area is large. When the light mixing distance is a fixed value, the illumination angle of the LED lamp close to the coupling slit is larger, and the light mixing effect is better.

In an embodiment, in the liquid crystal display panel, as shown in FIG. 3, illumination angles of the first LED lamp 201 and the second LED lamp 202 are both the first angle R1. In the embodiment, the illumination angle is made larger than the natural illumination angle of the white LED lamp. All of the first LED lamps 201 and the second LED lamps 202 are made into blue LED lamps, and can also achieve a larger illumination angle.

In an embodiment, in the liquid crystal display panel, as shown in FIG. 4, a distance between two adjacent first LED lamps 201 is less than a distance between two adjacent second LED lamps 202. It can only change the distances of the first LED lamps 201 close to the coupling position. The small distance can make the number of LED lights set per unit area greater, obtaining more light intensity and improving the light mixing effect.

In an embodiment, in the liquid crystal display panel, as shown in FIG. 4, in the coupling area, the distances between the first LED lamps 201 are gradually reduced in a direction toward the coupling slit. This arrangement allows for a denser setting of the LEDs close to the coupling slits. Under a same voltage, the LED light setting density is higher and the light mixing effect is better when the illumination angle is constant.

In an embodiment, in the liquid crystal display panel, in the coupling area, the distances between the first LED lamps 201 are the same, and the first LED lamps 201 have uniform density in the coupling area. The distance between two adjacent first LED lamps 201 is the same, the process is easier to implement, and the cost is saved.

In an embodiment, in the liquid crystal display panel, the first LED lamps 201 are white LED lamps, and the second LED lamps 202 are white LED lamps. The first LED lamps 201 and the second LED lamps 202 are both set as white LED lamps to make the process simpler and more common. The embodiment can also achieve better light mixing effect by improving the distance or the illuminating angle of the first LED lamps 201.

In an embodiment, in the liquid crystal display panel, as shown in FIG. 5, the first LED lamps 201 are blue LED lamps, a conversion film 301 is provided in a light emitting direction of the first LED lamps 201, and the conversion film 301 converts blue light into white light. The conversion film 301 can be coated in a non-light board area. The blue light emitted by the blue LED lamps turns white light through luminescent particles.

In an embodiment, in the liquid crystal display panel, as shown in FIG. 5, the conversion film 301 is disposed on a side of the diffusion plate 303 close to the LED strips 20. The blue light emitted by the blue LED lamps passes through the luminescent particles disposed on one side of the diffusion plate to become white light, and does not affect the normal illumination of the display panel.

In an embodiment, in the liquid crystal display panel, as shown in FIG. 5, the whole conversion film 301 is disposed on one side of the diffusion plate. Because the normal coupling scheme is that the conversion film 301 is disposed on the blue LED lamps to form white LED lamps, and then through the coupling, the conversion film 301 at the coupling portion may have a problem that a fluorescent film is broken, affecting the continuity of the light and also causing dark lines. By disposing the conversion film 301 on an upper side of the diffusion plate, the film formed by the conversion film 301 can be a continuous film on the entire surface, which alleviates the problem of the fracture of the fluorescent film at the coupling.

In an embodiment, in the liquid crystal display panel, as shown in FIG. 6, the first LED lamps 201 and the second LED lamps 202 are white LED lamps, and the conversion film 301 is coated on the blue LED lamps to form a whole layer of white LED lamps.

In an embodiment, in the liquid crystal display panel, as shown in FIG. 7, the second LED lamps 202 are white LED lamps, and the conversion film 301 is coated on the second LED lamps 202 to form a whole layer of white LED lamps.

The present invention further provides a liquid crystal display device comprising a liquid crystal display panel. The liquid crystal display panel comprises a backlight module and a display screen. The backlight module comprises a light source, an optical film 302, a diffusion plate 303, a back plate 10, and LED strips on the back plate 10. The back plate 10 forms a receiving cavity. The light source is arranged in the receiving cavity and is disposed on a bottom surface of the back plate 10. The light source comprises at least two coupled LED strips 20. The LED strips 20 comprise a plurality of first LED lamps 201 and a plurality of second LED lamps 202, and the first LED lamps 201 are disposed in a coupling area. The diffusion plate 303 is arranged in the receiving cavity and disposed in a light emitting direction of the LEDs strip 20. A distance between the diffusion plate and the LED lamps on the LED strips 20 is less than a default value. The optical film 302 is arranged in the receiving cavity and disposed in a light emitting direction of the diffusion plate 303. Wherein, the LED lamps which are at an end of the LED strips and adjacent to a coupling position have an illuminating inner diameter on the diffusion plate 303, and the illuminating inner diameter is greater than an edge length to the coupling position.

In the embodiment, the liquid crystal display device comprises the liquid crystal display panel, and the liquid crystal display panel comprises the backlight module and the display screen. The backlight module comprises the light source, the optical film 302, the diffusion plate 303, the back plate 10, and the LED strips on the back plate 10. The back plate 10 forms the receiving cavity. The light source is arranged in the receiving cavity and is disposed on the bottom surface of the back plate 10. The light source comprises the at least two coupled LED strips 20. The LED strips 20 comprise the plurality of first LED lamps 201 and the plurality of second LED lamps 202, and the first LED lamps 201 are disposed in the coupling area. The diffusion plate 303 is arranged in the receiving cavity and disposed in the light emitting direction of the LED strips 20. The distance between the diffusion plate and the LED lamps on the LED strips 20 is less than the default value. The optical film 302 is arranged in the receiving cavity and disposed in the light emitting direction of the diffusion plate 303. Wherein, the LED lamps which are at the end of the LED strips and adjacent to the coupling position have the illuminating inner diameter on the diffusion plate 303, and the illuminating inner diameter is greater than the edge length to the coupling position. When the light mixing distance is less than the default value, the first LED lamps 201 close to the coupling slit have the illuminating inner diameter on the diffusion plate 303, and the illuminating inner diameter is greater than the edge length to the coupling position, which improves the light mixing effect and improves the technical problem of poor light mixing effect of the backlight module.

In an embodiment, in the liquid crystal display device, as shown in FIG. 2, in the coupling area, an illumination angle of the LED lamp is a first angle, and the first angle is greater than a threshold value. An illumination angle of blue light is usually greater than an illumination angle of white light, and the illumination angle of the blue light is an illumination angle of a blue LED lamp without manual processing.

In an embodiment, in the liquid crystal display device, as shown in FIG. 2, an illumination angle of the first LED lamp 201 is a first angle R1, an illumination angle of the second LED lamp 202 is a second angle R2, and the first angle R1 is greater than the second angle R2. The illumination angle of the first LED lamp 201 in the coupling area is large. When a light mixing distance is a fixed value, the illumination angle of the LED lamp close to the coupling slit is larger, and the light mixing effect is better.

In an embodiment, in the liquid crystal display device, as shown in FIG. 3, illumination angles of the first LED lamp 201 and the second LED lamp 202 are both the first angle R1. In the embodiment, the illumination angle is made larger than the natural illumination angle of the white LED lamp. All of the first LED lamps 201 and the second LED lamps 202 are made into blue LED lamps, and can also achieve a large illumination angle.

In an embodiment, in the liquid crystal display device, as shown in FIG. 4, a distance between two adjacent first LED lamps 201 is less than a distance between two adjacent second LED lamps 202. It can only change the distances of the first LED lamps 201 close to the coupling position. The small distance can make the number of LED lights set per unit area greater, obtaining more light intensity and improving the light mixing effect.

In an embodiment, in the liquid crystal display device, in the coupling area, the distances between the first LED lamps are different, and the distances between the first LED lamps close to the coupling slit are small.

In an embodiment, in the liquid crystal display device, as shown in FIG. 4, in the coupling area, the distances between the first LED lamps 201 are gradually reduced in a direction toward the coupling slit. This arrangement allows for a denser setting of the LEDs close to the coupling slits. Under a same voltage, the LED light setting density is higher and the light mixing effect is better when the illumination angle is constant.

In an embodiment, in the liquid crystal display device, in the coupling area, the distances between the first LED lamps 201 are the same, and the first LED lamps 201 have uniform density in the coupling area. The distance between adjacent two first LED lamps 201 is the same, the process is easier to implement, and the cost is saved.

In an embodiment, in the liquid crystal display device, the first LED lamps 201 are white LED lamps, and the second LED lamps 202 are white LED lamps. The first LED lamps 201 and the second LED lamps 202 are both set as white LED lamps to make the process simpler and more common.

The embodiment can also achieve better light mixing effect by improving the distance or the illuminating angle of the first LED lamps 201.

In an embodiment, in the liquid crystal display device, as shown in FIG. 5, the first LED lamps 201 are blue LED lamps, a conversion film 301 is provided in a light emitting direction of the first LED lamps 201, and the conversion film 301 converts blue light into white light. The conversion film 301 can be coated in a non-light board area. The blue light emitted by the blue LED lamps turns white light through luminescent particles.

In an embodiment, in the liquid crystal display device, as shown in FIG. 5, the conversion film 301 is disposed on a side of the diffusion plate 303 close to the LED strips 20. The blue light emitted by the blue LED lamps passes through the luminescent particles disposed on one side of the diffusion plate to become white light, and does not affect the normal illumination of the display panel.

In an embodiment, in the liquid crystal display device, as shown in FIG. 5, the whole conversion film 301 is disposed on one side of the diffusion plate. Because the normal coupling scheme is that the conversion film 301 is disposed on the blue LED lamp to form a white LED lamp, and then through the coupling, the conversion film 301 at the coupling portion may have a problem that a fluorescent film is broken, affecting the continuity of the light, and also causing dark lines. By disposing the conversion film 301 on an upper side of the diffusion plate, the film formed by the conversion film 301 can be a continuous film on the entire surface, which alleviates the problem of the fracture of the fluorescent film at the coupling.

In an embodiment, in the liquid crystal display device, as shown in FIG. 6, the first LED lamps 201 and the second LED lamps 202 are white LED lamps, and the conversion film 301 is coated on the blue LED lamps to form a whole layer of white LED lamps.

In an embodiment, in the liquid crystal display device, as shown in FIG. 7, the second LED lamps 202 are white LED lamps, and the conversion film 301 is coated on the second LED lamps 202 to form a whole layer of white LED lamps.

With the increasing demand for large size, light weight, thinness, and colorfulness of LCD TVs, in order to facilitate the production of large-size backlights, in the prior art, a large-sized light guide plate is formed by coupling a plurality of small-sized light guide plates. The LED chips are distributed in an edge-light manner around each small-sized light guide plate. The backlight structure can be reduced, and a single large-sized light guide plate is divided into thousands of small light guide plates, which solves the problem of processing and light propagation of large-sized light guide plates, and reduces the thickness of the backlight. However, dark lines appear at slits between adjacent light guide plates, which affects the uniformity of the entire backlight. To eliminate the dark lines at the silts, a proper light mixing distance in the backlight is needed. Generally, a light mixing distance of more than 3 mm is required, and a thin and light design is difficult to provide sufficient light mixing distance, thereby leading to occurrence of dark lines.

By improving the LED light at the coupling position, the present invention makes S greater than or equal to L, and does not affect the light mixing effect and alleviates the dark lines when the light mixing distance is reduced.

In an embodiment, a light mixing layer is disposed between the optical film 302 and the backing plate 10. The transmittance of the light mixing layer is preferably greater than or equal to 90%, and a material of the light mixing layer may be polymethyl methacrylate or polycarbonate. In addition, it can also be made of other materials with higher light transmittance and lighter weight.

According to the above embodiment, it can be known that:

the present invention provides a backlight module. The backlight module includes a light source, an optical film, a diffusion plate, a back plate, and LED strips disposed on the back plate. The back plate forms a receiving cavity. The light source is arranged in the receiving cavity and disposed on a bottom surface of the back plate. The light source includes at least two coupled LED strips. The diffusion plate is arranged in the receiving cavity and disposed in a light emitting direction of the LED strips. A distance between the diffusion plate and the LED lamps on the LED strips is less than a default value. The optical film is arranged in the receiving cavity and disposed in a light emitting direction of the diffusion plate. Wherein, the LED lamps which are at an end of the LED strips and adjacent to a coupling position have an illuminating inner diameter on the diffusion plate, and the illuminating inner diameter is greater than an edge length to the coupling position. When a light mixing distance is less than the default value, the LED lamps which are at an end of the LED strips and adjacent to a coupling position have an illuminating inner diameter on the diffusion plate, and thus improves technical problems of poor light mixing in backlight modules.

In the above, various other corresponding changes and modifications can be made according to the technical solutions and technical ideas of the present invention to those skilled in the art, and all such changes and modifications are within the scope of the claims of the present invention.

What is claimed is:

1. A backlight module, comprising:
   a back plate forming a receiving cavity;
   a light source arranged in the receiving cavity and disposed on a bottom surface of the back plate, wherein the light source comprises at least two LED strips coupled to the back plate, the at least two LED strips comprise a plurality of first LED lamps and a plurality of second LED lamps, and the first LED lamps are disposed in a coupling area;
   a diffusion plate arranged in the receiving cavity and disposed in a light emitting direction of the at least two LED strips; and
   an optical film arranged in the receiving cavity and disposed in a light emitting direction of the diffusion plate;
   wherein the first and second LED lamps which are at an end of the LED strips and adjacent to a coupling position has an illuminating inner diameter on the diffusion plate, and the illuminating inner diameter is greater than an edge length to the coupling position;
   wherein the first and second LED lamps are forward light sources to the diffusion plate and the optical film;
   wherein in the coupling area, an illumination angle of the first and second LED lamps is a first angle, and the first angle is greater than a threshold value;
   wherein the threshold value is the illumination angle of the first and second LED lamps when S is equal to L, S is an inner diameter length projected onto a diffusion film by the first LED lamp close to a coupling slit, and L is a distance between the first LED lamp close to the coupling slit and the coupling slit.

2. The backlight module as claimed in claim 1, wherein an illumination angle of the first LED lamps is the first angle, an illumination angle of the second LED lamps is a second angle, and the first angle is greater than the second angle.

3. The backlight module as claimed in claim 1, wherein illumination angles of the first LED lamps and the second LED lamps are both the first angles.

4. The backlight module as claimed in claim 1, wherein a distance between two adjacent first LED lamps is less than a distance between two adjacent second LED lamps.

5. The backlight module as claimed in claim 4, wherein in the coupling area, distances between the first LED lamps are different, and a distance between the first LED lamps close to a coupling slit is short.

6. The backlight module as claimed in claim 4, wherein in the coupling area, distances between the first LED lamps are same.

7. The backlight module as claimed in claim 5, wherein in the coupling area, the distances between the first LED lamps are gradually reduced in a direction toward the coupling slit.

8. The backlight module as claimed in claim 1, wherein the first LED lamps are blue LED lamps, a conversion film is provided in a light emitting direction of the first LED lamps, and the conversion film converts blue light into white light.

9. The backlight module as claimed in claim 8, wherein the conversion film is disposed on a side of the diffusion plate close to the at least two LED strips.

10. A backlight module, comprising:
    a back plate, forming a receiving cavity;
    a light source arranged in the receiving cavity and disposed on a bottom surface of the back plate, wherein the light source comprises at least two LED strips coupled to the back plate, the at least two LED strips comprise a plurality of first LED lamps and a plurality of second LED lamps, the first LED lamps are disposed in a coupling area, the first LED lamps are white LED lamps, and the second LED lamps are white LED lamps;
    a diffusion plate arranged in the receiving cavity and disposed in a light emitting direction of the at least two LED strips; and
    an optical film arranged in the receiving cavity and disposed in a light emitting direction of the diffusion plate;
    wherein the first and second LED lamps which are at an end of the at least two LED strips and adjacent to a coupling position has an illuminating inner diameter on the diffusion plate, and the illuminating inner diameter is greater than an edge length to the coupling position;
    wherein the first and second LED lamps are forward light sources to the diffusion plate and the optical film;
    wherein in the coupling area, an illumination angle of the first and second LED lamps is a first angle, and the first angle is greater than a threshold value;
    wherein the threshold value is the illumination angle of the first and second LED lamps when S is equal to L, S is an inner diameter length projected onto a diffusion film by the first LED lamp close to a coupling slit, and L is a distance between the first LED lamp close to the coupling slit and the coupling slit.

11. The backlight module as claimed in claim 10, wherein an illumination angle of the first LED lamps is the first angle, an illumination angle of the second LED lamps is a second angle, and the first angle is greater than the second angle.

12. The backlight module as claimed in claim 10, wherein illumination angles of the first LED lamps and the second LED lamps are both the first angle.

13. The backlight module as claimed in claim 10, wherein a distance between two adjacent first LED lamps is less than a distance between two adjacent second LED lamps.

14. The backlight module as claimed in claim 13, wherein in the coupling area, distances between the first LED lamps are different, and a distance between the first LED lamps close to a coupling slit is short.

15. The backlight module as claimed in claim 14, wherein in the coupling area, distances between the first LED lamps are same.

16. The backlight module as claimed in claim 14, wherein in the coupling area, the distances between the first LED lamps are gradually reduced in a direction toward the coupling slits.

* * * * *